(12) United States Patent
Gaiser et al.

(10) Patent No.: US 6,470,595 B1
(45) Date of Patent: Oct. 29, 2002

(54) PROCESS AND DEVICE FOR CONTINUOUSLY DRYING PROTEIN-CONTAINING SLUDGE

(75) Inventors: Peter Gaiser; Ulrich Plantikow, both of München (DE); Dieter Kowalczyk, Mariestad (SE)

(73) Assignee: Andritz-Patentverwaltungsgesellschaft m.b.H., Graz (AT)

( * ) Notice: Subject to any disclaimer, the term of this patent is extended or adjusted under 35 U.S.C. 154(b) by 0 days.

(21) Appl. No.: 08/981,233
(22) PCT Filed: Jun. 18, 1996
(86) PCT No.: PCT/EP96/02633
§ 371 (c)(1),
(2), (4) Date: Apr. 2, 1998
(87) PCT Pub. No.: WO97/00229
PCT Pub. Date: Jan. 3, 1997

(30) Foreign Application Priority Data

Jun. 19, 1995 (DE) .......................................... 192 22 164

(51) Int. Cl.[7] ................................................ F26B 3/08
(52) U.S. Cl. ............................ 34/359; 34/360; 34/361; 34/384; 34/368; 34/576; 34/586; 34/584; 34/387
(58) Field of Search .......................... 34/359, 360, 361, 34/362, 363, 367, 368, 370, 371, 384, 387, 576, 578, 580, 586, 589

(56) References Cited

U.S. PATENT DOCUMENTS

| | | | | | |
|---|---|---|---|---|---|
| 3,815,255 A | * | 6/1974 | Yamato | ........................ | 34/57 |
| 4,070,765 A | * | 1/1978 | Hovmand et al. | ............. | 34/10 |
| 4,330,411 A | * | 5/1982 | Florin et al. | ................ | 210/769 |
| 5,426,866 A | * | 6/1995 | Rumocki | ..................... | 34/321 |
| 5,596,815 A | * | 1/1997 | Rice et al. | .................... | 34/346 |
| 6,270,708 B1 | * | 8/2001 | Gurol | .......................... | 34/363 |

* cited by examiner

Primary Examiner—William C. Doerrler
Assistant Examiner—Mark Shulman
(74) Attorney, Agent, or Firm—Birch, Stewart, Kolasch & Birch, LLP

(57) ABSTRACT

A process and a device for continuously drying protein-containing sludge, in particular sewage sludge, in a fluidised bed (20) inside a drying container (13). A drying gas flows through the fluidised bed (20) while partially de-watered sludge (6) in granulate form (21) is added to the fluidised bed (20) while dried sludge (10) is withdrawn therefrom. The granules (21) are formed without admixture of dried substances and are granulated preferably at the same time as they are pressed. Sewage sludge may thus be dried without admixture or recycling of dried substances, so that a highly efficient plant is obtained. In addition, a granulated dry material is produced which may be used in various ways.

32 Claims, 1 Drawing Sheet

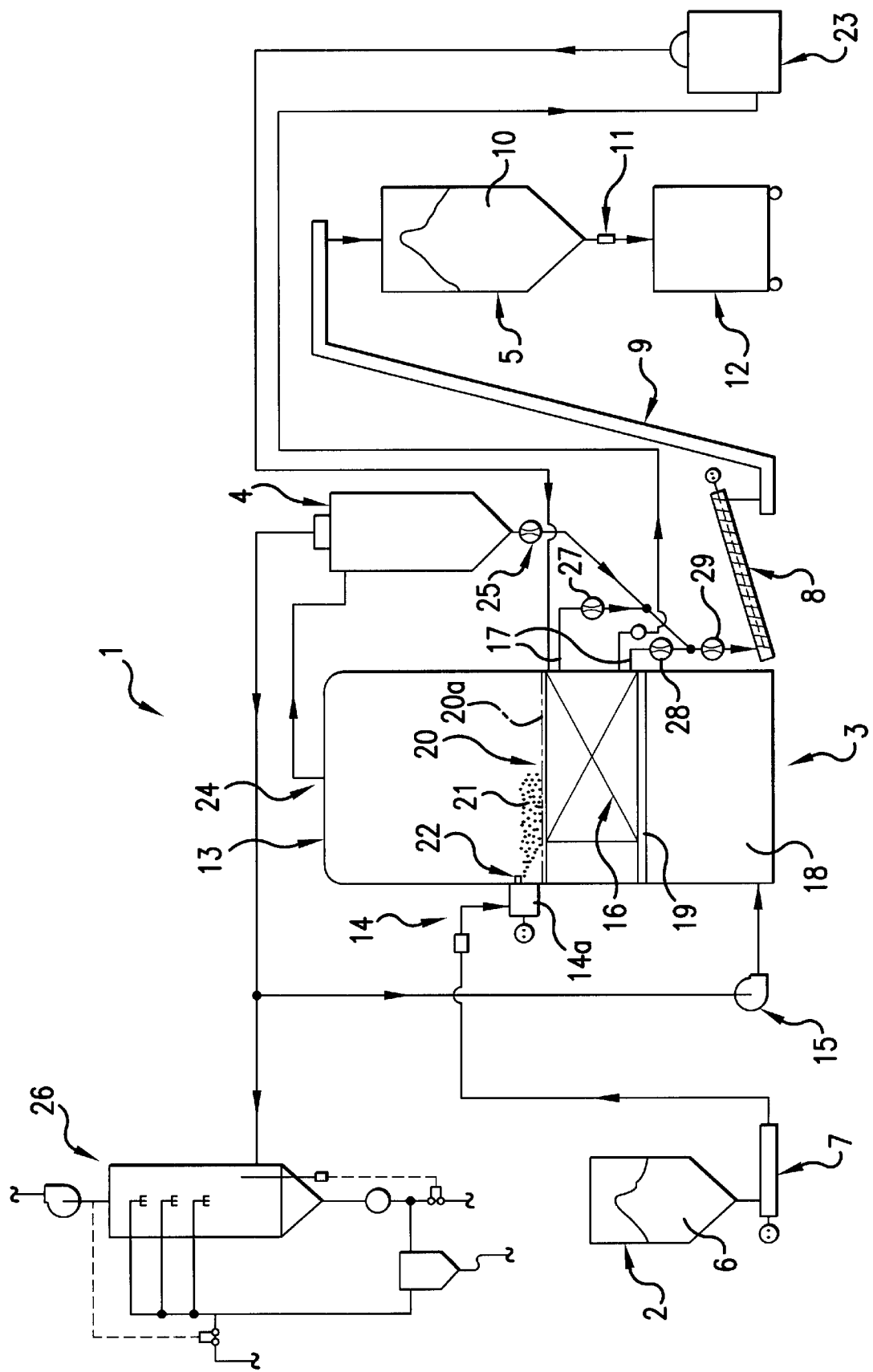

PROCESS AND DEVICE FOR CONTINUOUSLY DRYING PROTEIN-CONTAINING SLUDGE

The invention relates to a process and a device for continuously drying protein-containing sludge, in particular sewage sludge, in a fluidised bed through which a drying gas flows, wherein partially de-watered sludge is added to the fluidised bed in granulate form and dried sludge is removed therefrom, respectively comprising a drying container having a lower receiving chamber for the drying gas and a gas-permeable support for the fluidised bed, means for feeding the partially de-watered sludge and means for withdrawing the dried sludge, with the feeding means including granulating means.

Sludges of the type in question are present e.g. in purification plants for communal or industrial sewage including at least one biological treatment stage, in paper manufacture or e.g. in the form of oil sludge and as a general rule presenting a solid content of 2 to 5%. By means of mechanical preliminary desiccation, the solid content is mostly raised to 20 to 30%. For subsequent use, e.g. dumping, as an aggregate, as a fuel or as a fertiliser, further drying is required. In most cases storability and sufficient grindability are demanded which are attained only at solid contents exceeding 90% which render the dried sewage sludge biologically stable. Particularly when used as a fertiliser, a grain size varying only within the narrow range corresponding to the one of mineral fertilisers is demanded, such that the dried sludge may be spread in the fields without any modification of available machinery.

It is known from DE 39 02 446 C1 to introduce sewage sludge into an indirectly heated, fluidised sand bed for drying. In this process the sludge is pre-dried such as to comprise a residual water content of approx. 40%. At this water content it is still suited for pumping while, on the other hand, having passed through the so-called "sticky" phase inherently presenting the risk of the material adhering to itself and to the housing even prior to its introduction into the sand bed. It is a drawback of this process that the sewage sludge is altogether comminuted into dust during drying in the sand bed.

From DE 42 42 747 A1, a process for fluidised-bed drying of sludge in the absence of dry foreign matter such as sand is known. The violent frictional motions of particles in the fluidised bed result in abraded particles which are present in the form of fines. In this known process, approx. 90% of the dried sludge are again admixed to the partially de-watered sludge prior to drying. This serves to rapidly pass through the so-called "sticky" phase occurring at a content of solids of approx. 40 to 60% during the drying process.

A drawback of this process resides in the low efficiency as only approx. 10%, respectively, of the dried sludge can be withdrawn, and in the high proportion of fines having particle diameters of up to 500 $\mu$m, which proportion may constitute up to 20% of the total mass of the dried sludge in this process. Furthermore, in the absence of additional precautions, there is a risk of spontaneous combustion with atmospheric oxygen and of dust explosions owing to the high proportion of fines.

From DE 29 43 558 A1 there is finally known a process for processing sewage sludge, wherein sewage sludge preliminarily de-watered by mechanical means is granulated and dried in a moving-bed dryer. For granulation of the sludge preliminarily de-watered by mechanical means, i.a. a dried granulate is admixed in the mixing granulator. The mixed granulate thus produced already includes a relatively high content of dry substances and has therefore, upon entering into the fluidised bed, already left the "sticky" phase. By providing the sludge in granulate form, i.e. in the form of a multiplicity of granules, a large particle surface and thus good heat transfer from the drying gas is achieved. This fundamentally allows for efficient utilisation of the input energy.

The efficiency of this process is, however, relatively low owing to recycling or admixture, respectively, of dry substances.

It is an object of the invention to furnish a process and a device of the type indicated in the introduction for drying protein-containing sludge, in particular sewage sludge, whereby the addition of foreign matter in the fluidised bed as well as recycling of already dried sludge and dust into the process may be avoided, resulting in increased efficiency and lower energy consumption.

In terms of process technology, this object is attained by forming the granules without the addition of dried substances, and through the circumstance that the granulating process is preferably combined with pressing; in terms of device technology it is achieved in that means for the admixture of dried substances are eliminated in the feeding means.

As a result, surprising phenomena may be utilised in the fluidised bed for drying sludge. Thus it was found that the granulate shape enables admission of the sticky phase into the drying container.

In this continuous process the fluidised bed contains granular particles throughout the various stages of drying. This allows for omitting the recycling of dried material inasmuch as a sufficient quantity of dried granular material for rapidly passing through the sticky phase is present in the drying container at all times. Due to mixing with the dried granular material, accelerated surface drying to a content of solids of more than 60% is achieved, such that the granular material is subject to the risk of adhering for only a short period.

It is another surprising advantage that a major proportion of the dust formed as a result of abrasion of already dried granular material is bound to the humid particles in the fluidised bed which are still in the sticky phase. This reduces the quantity of dust and efficiently prevents deposition of particles in the sticky phase on plant components as well as agglomeration thereof. This is particularly true if the drying gas is circulated without dust recovery, with dust recovery being performed only on the exhaust vapor exiting from the dryer.

Moreover the pressing of the granular materials concurrently performed with shaping by means of granulating means provided in the function of a granulator is of advantage. Hereby the granular material is given an initial stability which is advantageous for drying in the fluidised bed. There would otherwise exist the danger of the particles disintegrating in the fluidised bed, and further use of the granular materials would not be possible. The newly supplied particles are mixed by the inflow of drying gas with the already dried granules in the fluidised bed, and due to the resulting thorough mixing, the large particle surface and selection of a suitable drying gas, rapid drying or curing on the particle surface is achieved, resulting in the granular material maintaining a stable shape and the granules hardly adhering to each other.

As the granular material supplied to the fluidised bed includes a high water content of generally about 75%, the particles shrink during drying. Owing to the irregular shrinking engendered by rapid surface drying while the interior is still humid and owing to the various degrees of abrasion, an irregularly shaped dry granulate including cavities in which dust accumulates during drying is produced in the course of the drying process.

This considerably reduces the quantity of dust while precluding the risk of dust explosion in the absence of any additional measures.

Size and shape of the dried granular material may be influenced by using various types of granulators and by varying the operating parameters during grain conformation. Hereby a narrow grain size distribution at grain diameters of a few millimeters and adaptation to the specific application and to customers' specifications are achieved, e.g. for use in fertilizer spreaders or for pressurized air injection in combustion facilities. The granular material has granules which are preferably 1–10 mm in average diameter, more preferably 3 to 7 mm and most preferably about 5 mm.

Where the granular material is supplied onto the fluidised bed by corresponding technical devices immediately following its conformation and by gravity, clotting of the grains and adhering to plant components may be avoided and good mixing with the particles already dried on the surface may be achieved.

Directly supplying the granular material below the surface of the fluidised bed ensures that the granular material is exposed to the drying process without delay.

Where a preliminary product for the granular material is used, e.g. in the form of notched rods, this allows for simplification of the shaping process and of the granulating means without impairing the quality of the final product.

By limiting the supplied granules to a particular range of diameters, i.e., realisation of a specific particle shape and size, the respective users' demands with respect to storability, transportability and applicability of the final product can be met.

Drying of the sludge to contents of solids of more than 90% guarantees biological stability of the final product.

Owing to the preferred use of superheated water vapor as the drying medium, the high specific thermal capacity thereof is made use of and very good heat transfer to the material to be dried is achieved. As a result, the sticky phase is passed through rapidly, energy input is utilised efficiently, and a lower energy consumption is achieved.

The expelled exhaust vapor may be condensed practically entirely, and the condensate may be supplied to the purification plant. As long as the water vapor temperature does not exceed a value of approx. 150° C., decomposition of the organic matter of the sewage sludge hardly takes place. The expelled exhaust vapor contains only small amounts of non-condensable gases in this case, so that only small amounts of exhaust gas have to be purified, or exhaust gas purification will be unnecessary under favorable circumstances.

The superheated water vapor moreover does not contain any oxygen and thus inherently precludes any danger of spontaneous combustion of the material to be dried and of dust explosion in the container.

As the temperature of the material to be dried is higher than the boiling temperature of water during the drying process, an environment in which any pathogenic germs possibly remaining in the sludge are destroyed is created in the effective range of the water vapor.

The process is started up by using an already dried granular material because a sludge only partially de-watered might adhere to itself and to the plant components and thus hamper build-up of a fluidised bed.

Utilisation of heat exchangers comprising respective heat exchanger surfaces in the fluidised bed permits efficient input of heat energy. This constitutes a considerable advantage as the superheated water vapor already transmits a considerable amount of energy to the granular material over the initial few centimeters of the fluidised bed.

Where saturated steam at preferably 5 to 25 bar pressure above atmospheric is used as a heating medium for the heat exchangers, transfer of a great amount of energy may be achieved at a relatively low throughput of heating medium.

A slight pressure above atmospheric in the drying plant prevents the intrusion of air through leaks.

A slight vacuum, on the other hand, prevents unpurified exhaust vapor from escaping from the drying plant.

It is another advantage of the process that owing to compression of the exhaust vapor expelled from the sludge by means of a corresponding compressor means and subsequent condensation at an elevated temperature in a heat exchanger, such as preferably the heat exchanger in the fluidised bed, evaporation energy of the expelled water may be recuperated as condensation heat and recycled into the drying process. This further reduces energy consumption.

An advantageous embodiment of the device may be realised by omitting admixing means for dry substances. Thus the expense in terms of device technology may be reduced and control of the drying plant is simplified substantially.

Positioning the outlet range of the granulating means above the fluidised bed is advantageous inasmuch as the outlet opening is not affected by impinging particles in this case.

Positioning the outlet range of the granulating means within the fluidised bed has the result that the granular material is immediately exposed to the effect of the fluidised bed. Particles possibly adhered in the outlet range of the granulator will again detach concurrently with ongoing drying under the influence of already largely dried particles of the fluidised bed.

It is another advantage if a granulating means is used wherein shaping is combined with pressing. This serves to reduce the risk of agglomeration of the granulate in the granulator or during transport into the dryer, and in addition less external air is admitted into the dryer. Moreover the granular material upon its entrance into the fluidised bed already has essentially better dimensional stability than in the case of a granulating process without pressing, such as e.g. by rotating blades.

Where the drying container is designed to be pressure-tight, air is prevented from entering and unpurified exhaust vapor is prevented from escaping.

The invention shall be explained in detail in the following drawing by referring to embodiments. The single figure of the drawing shows a process flow chart for a drying plant in accordance with the invention.

A drying plant 1 comprises a raw sludge hopper 2, a drying device 3, a dust extraction plant 4 having the form of a cyclone, and a dried material hopper 5.

Partially de-watered sludge 6 is pumped by a raw sludge pump 7 from the raw sludge hopper 2 to the drying device 3, is dried there and conveyed to the dried substances hopper 5 via a worm conveyor 8 and a bucket conveyor 9. The dried sludge 10 is filled into a transport container 12 through a metering slide valve The drying device 3 comprises a drying container 13, feeding means 14, a blower 15, a heat exchanger 16 and withdrawing means 17.

The drying container 13 includes a lower receiving chamber 18 wherein a steam fluidised bed is established and maintained with the aid of the blower 15 with superheated water vapor as the drying gas. Above a gas-permeable bottom slab or support 19, a fluidised bed 20 is formed during operation, the surface 20a of which is indicated by a dot-dashed line, and in which the partially de-watered sludge 6 is dried.

The feeding means 14 includes granulating means 14a provided in the function of a granulator. Hereby a granular material 21 is formed and transferred to the fluidised bed 20 of the drying container 13 via an outlet range 22 of granulating means 14a.

The fluidised bed 20 includes granules in various stages of drying, which are surrounded, set into motion and thus dried by a flow of superheated water vapor. The newly introduced granular material 21 mixes with the particles already present in the fluidised bed 20, the large number and high content of solids of which accelerates drying of the newly supplied particles. Owing to their favorable formation at small particle sizes, good dimensional stability and a comparatively large surface are achieved.

The surface of the granular material 21 rapidly dries under these circumstances and thus prevents clotting of the grains by rapidly passing through the "sticky phase" even though the interior of the particles has not yet overcome the sticky phase conditions. This produces a rigid exoskeleton with a soft inside. In the course of the drying process the granular material will then dry completely to have a content of solids in excess of 90%. In the process, an irregularly shaped dry granulate including cavities is formed as the result of shrinkage and mutual abrasion with other particles.

Owing to the rapid surface drying, the granular material essentially maintains its size predetermined by the conformation and dried, porous granular material having a diameter of several millimeters is obtained.

The dust forming as a result of abrasion may deposit in part on the particles whose surface is still contained in the sticky phase, and in part into the cavities of the granulate.

Inside the fluidised bed 20 the heat exchanger 16 is arranged which is supplied by a steam feeding means 23 with saturated steam pressurised to 5 to 25 bar pressure above atmospheric and thereby heats the fluidised bed 20. This serves to provide the superheated water vapor employed as a drying medium with energy in order to replenish the heat dissipated to the granular material 21 and thus maintain the function.

The superheated water vapor polluted as a result of the drying process, i.e., the so-called exhaust vapor, is discharged to the dust extraction plant 4 through an outlet 24 where the dust and fines contents are separated and recombined with the dried sludge 10 via a cellular wheel sluice 25. Via the blower 15 the purified exhaust vapor is again supplied to the drying device 3. The humidity supplied by the partially de-watered sludge 6 creates an excess of exhaust vapor which is supplied to a condensation and purification device 26 following dust extraction. This is where the exhaust vapor condenses, and the non-condensable contents are concurrently washed and—if necessary—further conveyed for deodorisation.

The dried sludge 10 is withdrawn through the withdrawing means 17 and via cellular wheel sluices 27, 28 and 29. By the worm conveyor 8 and the bucket conveyor 9 it is finally transferred to the dried material hopper 5.

In order to prevent condensation of water vapor inside the conduits serving for withdrawal from the fluidised bed 20 and from the dust extraction plant 4, these are thermally insulated and can be heated as far as the cellular wheel sluice 29. In order to preclude spontaneous combustion of the withdrawn, dried sludge, the worm conveyor 8 is cooled.

In accordance with another embodiment of the invention there exists another process variation which is particularly suited for sludges producing only small quantities of dust during drying. Other than in the above described process, not all of the exhaust vapor exiting from the dryer 3 at the outlet 24 is guided to the dust extraction plant 4, but only the excess exhaust vapor expelled from the material to be dried. The overwhelming part of the exhaust vapor exiting from the dryer 3 at the outlet 24 in turn serves the function of a fluidising medium for the fluidised bed and of a heat carrier and is directly taken back into the dryer by a blower 15 capable of conveying dust-laden exhaust vapor without performing dust extraction. In this process variation a considerably smaller-dimensioned dust extraction plant 4 is sufficient.

It is also possible to omit the dust extraction plant 4 and directly feed the excess, dust-laden exhaust vapor into the condensation and purification plant 26. In this plant 26 the exhaust vapor is condensed e.g. with the aid of injected cold water, and the dust is introduced into the condensate. The dust-laden condensate may then be introduced into the purification plant.

The dust extraction plant 4 is, however, required if it is desired to incorporate exhaust vapor compression, which is more favorable in terms of energy, into the plant because the exhaust vapor must be freed from dust prior to its entrance into the compressor.

It is evident from the above description that the invention allows for a multitude of modifications and variations without exceeding the scope of the invention.

Thus e.g. the granular material 21 can be supplied onto the fluidised bed 20 by gravity. This requires the outlet range 22 of the granulating means 14a to be positioned above the surface 20a of the fluidised bed. In this case it is advantageous if the granular material 21 is distributed over the surface 20a of the fluidised bed in the course of its application, thus permitting introduction of a larger quantity and rapid surface drying of the particles.

The granular material 21 may, however, also be supplied directly into the fluidised bed 20, in which case the outlet range 22 of the granulating means 14a is positioned below the surface 20a of the fluidised bed. Particles possibly adhered in the outlet range of the granulating means may then again detach under the influence of already dried particles.

Instead of the granular material 21, the granulating means 14a may also produce a preliminary product thereof, e.g. having the form of notched rods. This provides the advantage that the rod may spread across the fluidised bed 20 to then break off at a certain overlap, drop into the fluidised bed and be distributed there. Good distribution of the granular material 21 on the fluidised bed 20 is thus obtained.

It is moreover possible to apply a slight pressure above atmospheric to the drying container 13 in order to prevent intrusion of air. By means of a slight vacuum pressure in the drying container 13 it is, however, also possible to prevent unpurified exhaust vapor from escaping to the exterior.

In order to lower energy consumption, there is the option of integrating the energetically more favorable vapor compression into the plant. In this case the exhaust vapor expelled from the sewage sludge is not condensed in the condensation and purification device 26 in accordance with the representation of the flow chart, but e.g. compressed by means of a screw-type compressor and condensed at an elevated temperature in a heat exchanger, e.g. the heat exchanger 16 incorporated in the fluidised bed 20. Hereby a substantial part of the vaporisation heat of the expelled water is recycled into the drying process and energy consumption is reduced. The steam feeding means 23 is, in a given case, also required for starting up the plant.

In order to reduce energy consumption it is moreover possible to perform drying in several stages. In such a case the first fluidised-bed drying process is performed at a high system pressure in the dryer. The exhaust vapor expelled in this first stage may then be conveyed for condensation into the heat exchanger of a fluidised bed dryer of the second stage having a similar construction wherein drying in accordance with the invention is performed at a lower pressure. This second stage may accordingly be followed by a third stage or, according to necessity, even more stages.

What is claimed is:

1. A process for continuously drying protein-containing sludge in a fluidized bed (20) through which a drying gas flows, wherein partially de-watered sludge (6) is added to the fluidized bed (20) in granulate form (21) and dried sludge (10) is removed therefrom, wherein the granules are formed without the addition of dried substances and are applied to the fluidized bed (20) immediately following their production and are mixed with granular particles throughout various stages of drying contained in the fluidized bed.

2. The process according to claim 1, wherein the granular material (21) or a preliminary product thereof is applied onto the fluidized bed (20) immediately following its production and by gravity.

3. The process according to claim 1, wherein the granular material (21) or a preliminary product thereof is introduced directly into the fluidized bed (20) below the surface (20a) thereof.

4. The process according to any one of claims 1 to 3, wherein the granules (21) have an average diameter in the range of 1 to 10 mm.

5. The process according to claim 1, wherein the partially de-watered sludge (6) is dried to have a dry substance content of at least 90% of the mass of the dried product.

6. The process according to claim 1, wherein superheated water vapor is used as a drying gas.

7. The process according to claim 1, wherein the process start-up is carried out by using a fluidized bed (20) of already dried sludge (10) in granulate form.

8. The process according to claim 1, wherein the fluidized bed (20) is heated by means of a heat exchanger (16).

9. The process according to claim 8, wherein saturated steam having a pressure above atmospheric is used as a heating medium for the heat exchanger (16).

10. The process according to claim 1, wherein drying is performed at a pressure slightly above atmospheric pressure.

11. The process according to claim 1, wherein drying is performed at a pressure slightly below atmospheric pressure.

12. The process according to claim 1, wherein exhaust vapor expelled from the dried sludge (10) is compressed and condensed under the pressure elevated as a result of compression.

13. A device for continuously drying protein-containing sludge in a fluidized bed (20), comprising a drying container (13) which includes a lower receiving chamber (18) for drying gas and a gas-permeable support (19) for the fluidized bed (20), a feeding component (14) for feeding partially de-watered sludge (6) and a withdrawing component (17) for withdrawing the dried sludge (10), said feeding component (14) having a granulating component (14a) adapted to apply the produced granules immediately to the fluidized bed (20) in which the granules are mixed with granular particles throughout the various stages of drying contained in the fluidized bed (20), and said feeding component (14) does not include a means for admixing dried substances.

14. The device according to claim 13, wherein an outlet (22) of the granulating component (14a) is positioned adjacent to, or inside, the peripheral wall of the drying container (13) and above the gas permeable support (19).

15. The device according to claim 14, wherein the outlet (22) of the granulating component (14a) is positioned above a surface of the fluidized bed (20a).

16. The device according to claim 14, wherein the outlet (22) of the granulating component (14a) is positioned below a surface (20a) of the fluidized bed.

17. The device according to any one of claims 13 to 16, wherein the granulating component (14a) is adapted to form a preliminary product of the granular material (21).

18. The device according to claim 13, wherein the granulating component (14a) subjects granules to pressing forces during a granulating step.

19. The device according to claim 18, wherein the granules (21) have an average diameter in the range 1 to 10 mm.

20. The device according to claim 13, wherein at least one heat exchanger (16) is present in the fluidized bed (20) and includes heat exchanger surfaces onto which the material of the fluidized bed (20) may be applied.

21. The device according to claim 13, wherein the drying container (13) is adapted to be pressure-tight.

22. The device according to claim 13, further comprising a component for recuperating heat energy from expelled exhaust gas, wherein said component comprises a compressor and a condenser.

23. The process according to claim 1, wherein the protein-containing sludge is a sewage sludge.

24. The process according to claim 1, wherein the granules are formed with pressing.

25. The process according to claim 4, wherein the granules (21) have an average diameter in the range of 3 to 7 mm.

26. The process according to claim 4, wherein the granules (21) have an average diameter of about 5 mm.

27. The process according to claim 9, wherein the saturated steam has a pressure of 5 to 25 bar.

28. The process according to claim 12, wherein the exhaust vapor expelled from the dried sludge (10) is compressed and condensed under the pressure elevated as a result of compression in the heat exchanger (16) accommodated in the fluidized bed (20).

29. The device according to claim 13, wherein the protein-containing sludge is a sewage sludge.

30. The device according to claim 17, wherein the preliminary product of the granular material (21) is in the form of notched rods.

31. The device according to claim 19, wherein the granules (21) have an average diameter of 3 to 7 mm.

32. The device according to claim 19, wherein the granules (21) have an average diameter of about 5 mm.

* * * * *

(12) EX PARTE REEXAMINATION CERTIFICATE (8244th)
United States Patent
Gaiser et al.

(10) Number: US 6,470,595 C1
(45) Certificate Issued: May 17, 2011

(54) PROCESS AND DEVICE FOR CONTINUOUSLY DRYING PROTEIN-CONTAINING SLUDGE

(75) Inventors: Peter Gaiser, München (DE); Ulrich Plantikow, München (DE); Dieter Kowalczyk, Mariestad (SE)

(73) Assignee: Andritz-Ruthner, Inc., Arlington, TX (US)

Reexamination Request:
No. 90/008,189, Aug. 24, 2006

Reexamination Certificate for:
Patent No.: 6,470,595
Issued: Oct. 29, 2002
Appl. No.: 08/981,233
Filed: Apr. 2, 1998

(22) PCT Filed: Jun. 18, 1996
(86) PCT No.: PCT/EP96/02633
§ 371 (c)(1),
(2), (4) Date: Apr. 2, 1998
(87) PCT Pub. No.: WO97/00229
PCT Pub. Date: Jan. 3, 1997

(30) Foreign Application Priority Data

Jun. 19, 1995 (DE) .......................... 195 22 164

(51) Int. Cl.
F26B 3/08 (2006.01)
F26B 3/02 (2006.01)
C05F 7/00 (2006.01)
B01J 2/16 (2006.01)
C02F 11/12 (2006.01)

(52) U.S. Cl. .............................. 34/359; 34/360; 34/361; 34/368; 34/384; 34/387; 34/576; 34/584; 34/586

(58) Field of Classification Search ............ 34/359–363, 34/367, 368, 370, 371, 384, 387, 576, 578, 34/580, 586, 589
See application file for complete search history.

(56) References Cited

U.S. PATENT DOCUMENTS

| | | |
|---|---|---|
| 3,905,796 A | 9/1975 | Ghelfi |
| 4,028,030 A | 6/1977 | Imhof |
| 4,295,281 A | 10/1981 | Potter |
| 5,353,517 A | 10/1994 | Weiss |
| 5,596,815 A * | 1/1997 | Rice et al. ..................... 34/346 |

FOREIGN PATENT DOCUMENTS

JP 60075400 4/1985

OTHER PUBLICATIONS

Superheated steam. (1992). Academic Press Dictionary of Science and Technology. Retrieved Jul. 11, 2007, from http://www.credoreference.com/entry/3165131.*
Article by Florin, et al., "The Key to Sewage Sludge Disposal?", Sulzer Technical Review, 1994, vol. 76, pp. 18–22.
Peter R. Tronsberg et al., "Fluidized Bed Drying of Bio Solids Low Cost and Diversified Technology", presentation to WEFTEC, pp. 229–238 (1995).

* cited by examiner

*Primary Examiner* — Sara S Clarke

(57) ABSTRACT

A process and a device for continuously drying protein-containing sludge, in particular sewage sludge, in a fluidised bed (20) inside a drying container (13). A drying gas flows through the fluidised bed (20) while partially de-watered sludge (6) in granulated form (21) is added to the fluidised bed (20) while dried sludge (10) is withdrawn therefrom. The granules (21) are formed without admixture of dried substances and are granulated preferably at the same time as they are pressed. Sewage sludge may thus be dried without admixture or recycling of dried substances, so that a highly efficient plant is obtained. In addition, a granulated dry material is produced which may be used in various ways.

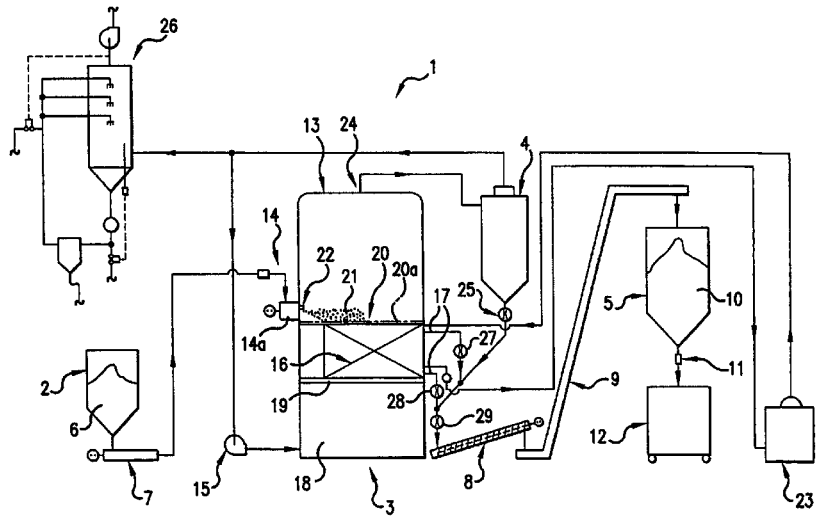

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 6, 13, 15 and 16 are determined to be patentable as amended.

Claims 4, 5, 7-12, 14 and 17-32, dependent on an amended claim, are determined to be patentable.

1. A process for continuously drying protein-containing sludge in a fluidized bed (20) thorugh which a drying gas flows, wherein partially de-watered sludge (6) is [added] *pumped* to the fluidized bed (20) in granulate form (21) and dried sludge (10) is removed therefrom,
   wherein the granules are formed without the addition of dried substances and are applied to the fluidized bed (20) immediately following their production and are mixed with granular particles throughout various stages of drying contained in the fluidized bed, *wherein the granules are introduced directly into the fluidized bed below a surface of the fluidized bed.*

2. The process according to claim 1, wherein the granular material (21) or a preliminary product thereof is applied [onto] *below the surface of* fluidized bed (20) immediately following its production and by gravity.

3. [The] *A* process [according to claim 1,] *for continuously drying protein-containing sludge in a fluidized bed (20) through which a drying gas flows, wherein partially de-watered sludge (6) is pumped and added to the fluidized bed (20) in granulate form (21) and dried sludge (10) is removed therefrom, wherein the granules are formed without the addition of dried substances and are applied to the fluidized bed (20) immediately following their production and are mixed with granular particles throughout various stages of drying contained in the fluidized bed,* wherein the granular material (21) or a preliminary product thereof is introduced directly into the fluidized bed (20) below the surface (20a) thereof.

6. [The] *A* process [according to claim 1] *for continuously drying protein-containing sludge in a fluidized bed (20) through which a drying gas flows, wherein partially de-watered sludge (6) is added to the fluidized bed (20) in granulate form (21) and dried sludge (10) is removed therefrom, wherein the granules are formed without the addition of dried substances and are applied to the fluidized bed (20) immediately following their production and are mixed with granular particles throughout various stages of drying contained in the fluidized bed,* wherein superheated water vapor is used as a drying gas.

13. A device for continuously drying protein-containing sludge in a fluidized bed (20), comprising
   a drying container (13) which includes a lower receiving chamber (18) for drying gas and a gas-permeable support (19) for the fluidized bed (20),
   a feeding component (14) for feeding partially de-watered sludge (6) *pumped from a pump (7)* and a withdrawing component (17) for withdrawing the dried sludge (10),
   said feeding component (14) having a granulating component (14a) adapted to apply the produced granules immediately to the fluidized bed (20) in which the granules are *introduced into the fluidized bed immediately following their production and directly below a surface of the fluidized bed and* mixed with granular particles throughout the various stages of drying contained in the fluidized bed (20), and
   said feeding component (14) does not include a means for admixing dried substances.

15. The device according to claim 14, wherein the outlet (22) of the granulating component (14a) is positioned [above a] *below the* surface of the fluidized bed (20a).

16. [The] *A* device [according to claim 14] *for continuously drying protein-containing sludge in a fluidized bed (20), comprising a drying container (13) which includes a lower receiving chamber (18) for drying gas and a gas-permeable support (19) for the fluidized bed (20), a feeding component (14) for feeding partially de-watered sludge (6) pumped from a pump (7) and a withdrawing componet (17) for withdrawing the dried sludge (10), said feeding component (14) having a granulating component (14a) adapted to apply the produced granules immediately to the fluidized bed (20) in which the granules are mixed with granular particles throughout the various stages of drying contained in the fluidized bed (20), and said feeding component (14) does not include a means for admixing dried substances, wherein an outlet (22) of the granulating component (14a) is positioned adjacent to, or inside, the peripheral wall of the drying container (13) and above the gas permeable support (19) and,* wherein the outlet (22) of the granulating component (14a) is positioned *from the outlet directly* below a surface (20a) of the fluidized bed.

* * * * *